Sept 10, 1957     R. H. KAMPFER     2,805,762
VERTICAL CONVEYOR
Filed Oct. 8, 1953     3 Sheets-Sheet 2

INVENTOR
Richard H. Kampfer
BY Robert M. Dunning
ATTORNEY

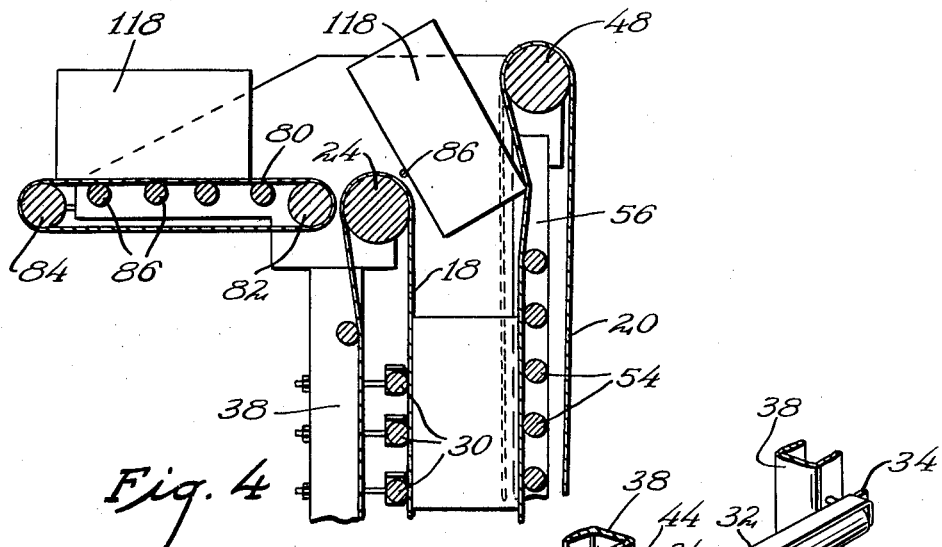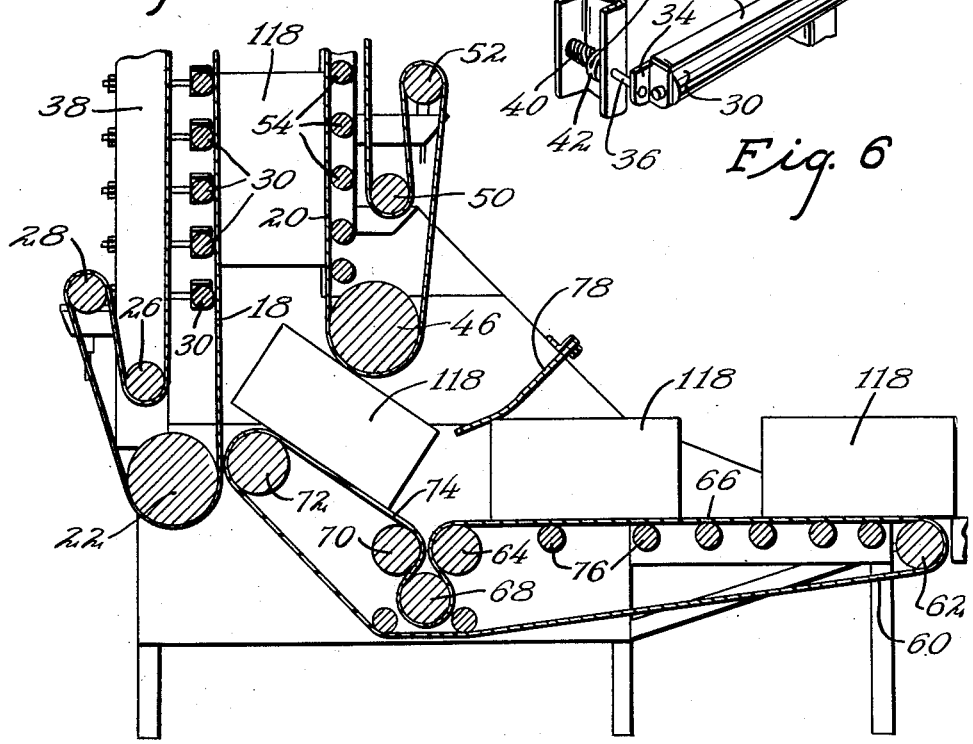

2,805,762
Patented Sept. 10, 1957

2,805,762
VERTICAL CONVEYOR

Richard H. Kampfer, St. Paul, Minn., assignor to Conveyor Specialties Company, St. Paul, Minn., a corporation of Minnesota Application October 8, 1953, Serial No. 384,879

2 Claims. (Cl. 198—165)

This invention relates in general to conveying apparatus and pertains more particularly to a conveyor especially suited for lifting articles, such as cartons or cases, in a vertical direction between two elevations.

In many instances, it is either mandatory or extremely expeditious to elevate packed cases or cartons in a vertical manner. In some installations such an arrangement is dictated by spaced limitations; in others, by the time allowed for transfer and handling. However, it has not been easy to perfect a conveyor capable of handling all types of products, especially those of a fragile or frangible nature, in a swift and efficient manner.

Accordingly, one object of the invention is to provide a conveyor which lends itself readily to installations where it is desirable to lift the articles substantially vertical.

In this connection, an aim of the present invention is to accomplish the foregoing end in such a way that there will be little likelihood of breakage.

Further, it is an object to transfer the articles quite rapidly, it being possible for instance to move beverage cases approximately 10" x 17" x 18" in size as fast as 3,000 per hour. Of course, such figures are illustrative and should not in any sense of the word be construed as limiting.

Another object of the invention is to provide a conveyor which is completely automatic in its operation and which requires little or no maintenance. More specifically, it is within the purview of this invention to utilize horizontal conveyor runs at two different elevations, together with the vertical opposed belting, which will tilt the cartons so as to always orient them in such a way that they will move consecutively without interference.

Still another object of the invention is to arrange the conveyor parts as a compact unit, thereby, if desired, rendering the apparatus of a semi-portable character which can be moved from place to place without undue inconvenience or trouble.

Yet another object of the invention is to utilize a single drive mechanism for powering the apparatus in a synchronized fashion so that the opposed belts will be driven at both the same speed and in the same direction.

Another object, it will be seen, resides in the provision for accommodating cases of somewhat different dimensions. For example, as hereinbefore stated the size of carton may be 10" x 17" x 18", but the 10" dimension is not an invariant, for it may range, say, from 8¾" to 10¼". As will be explained later, resilient means are utilized which will permit the opposed belts to grip the opposite sides of the article, even though such opposite sides are of different spacings. Of course, the particular dimensions of the apparatus, it will be appreciated, are determined by the size of case or cases to be handled.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

Figure 4 is a sectional view taken in the direction of line 4—4 of Figure 2, the view showing the exiting of a case from the vertical portion of the conveyor;

Figure 5 is a sectional view taken in the direction of line 5—5 of Figure 2, and Figure 6 is a fragmentary detail in perspective illustrating the manner in which one of the rollers is resiliently mounted.

Figure 1:
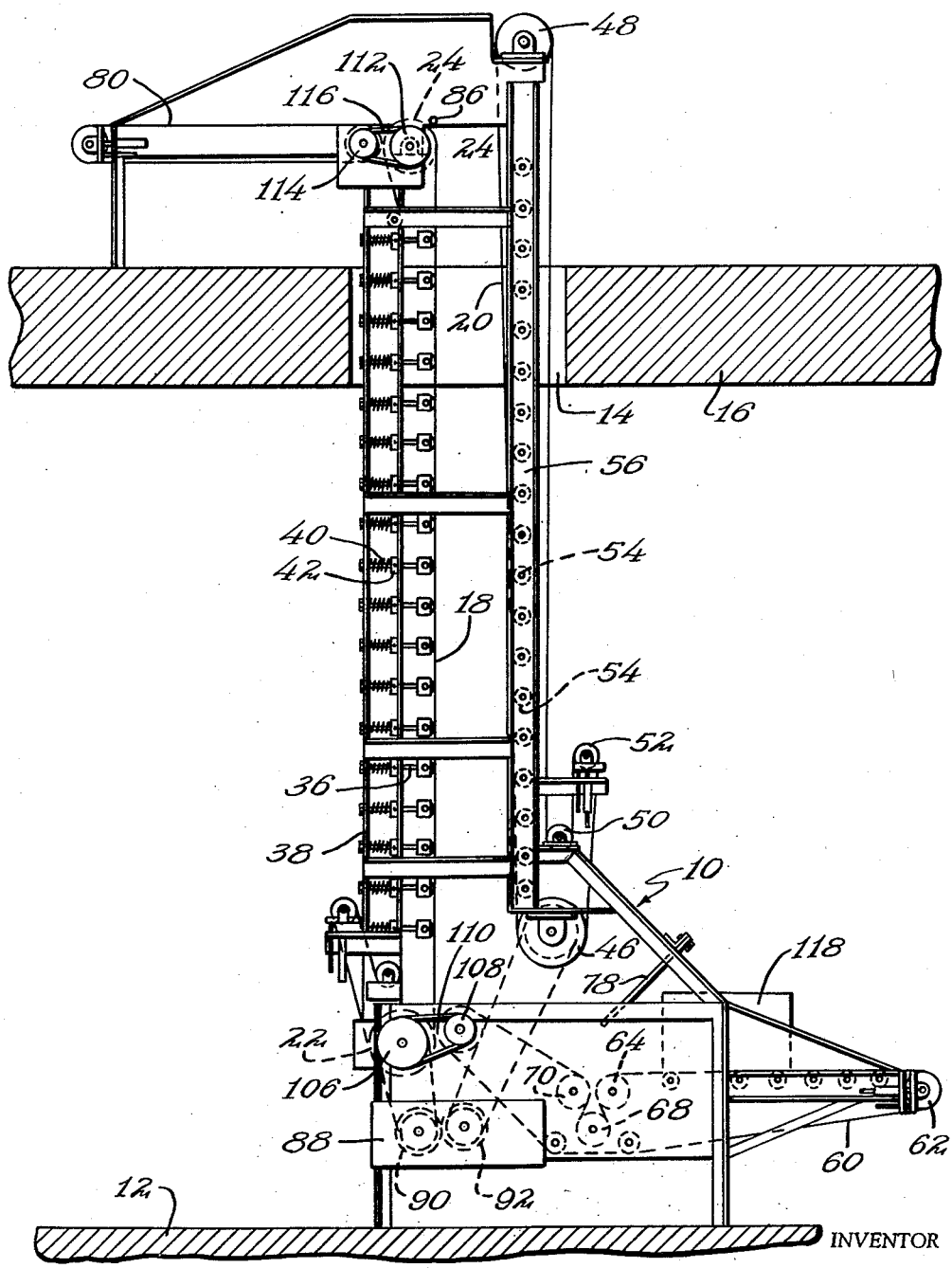
Figure 1 is a side elevational view of the conveyor forming the subject matter of the instant invention.

Referring in detail to the drawings a framework designated in its entirety by the reference numeral 10 rests on a base or lower flooring 12 and extends upwardly through an opening 14 in an upper floor 16. Playing an important part in the operation of the apparatus is a pair of flexible belts 18 and 20 of the endless variety and preferably rough topped to prevent the articles from slipping therebetween.

The belt 18 is entrained over a pair of main pulleys or drums 22, 24 and a pair of take-up pulleys 26, 28 for assuring the proper degree of belt tightness, the axis of the pulley 28 being positionable vertically to achieve this desired end. From an inspection of Figure 1 it can be seen that the pulleys 22 and 24 are disposed with their axes in vertical alignment so that that section of the belt 18 in opposed relation with the belt 20 is for all intents and purposes vertical.

Figures 2, 3:
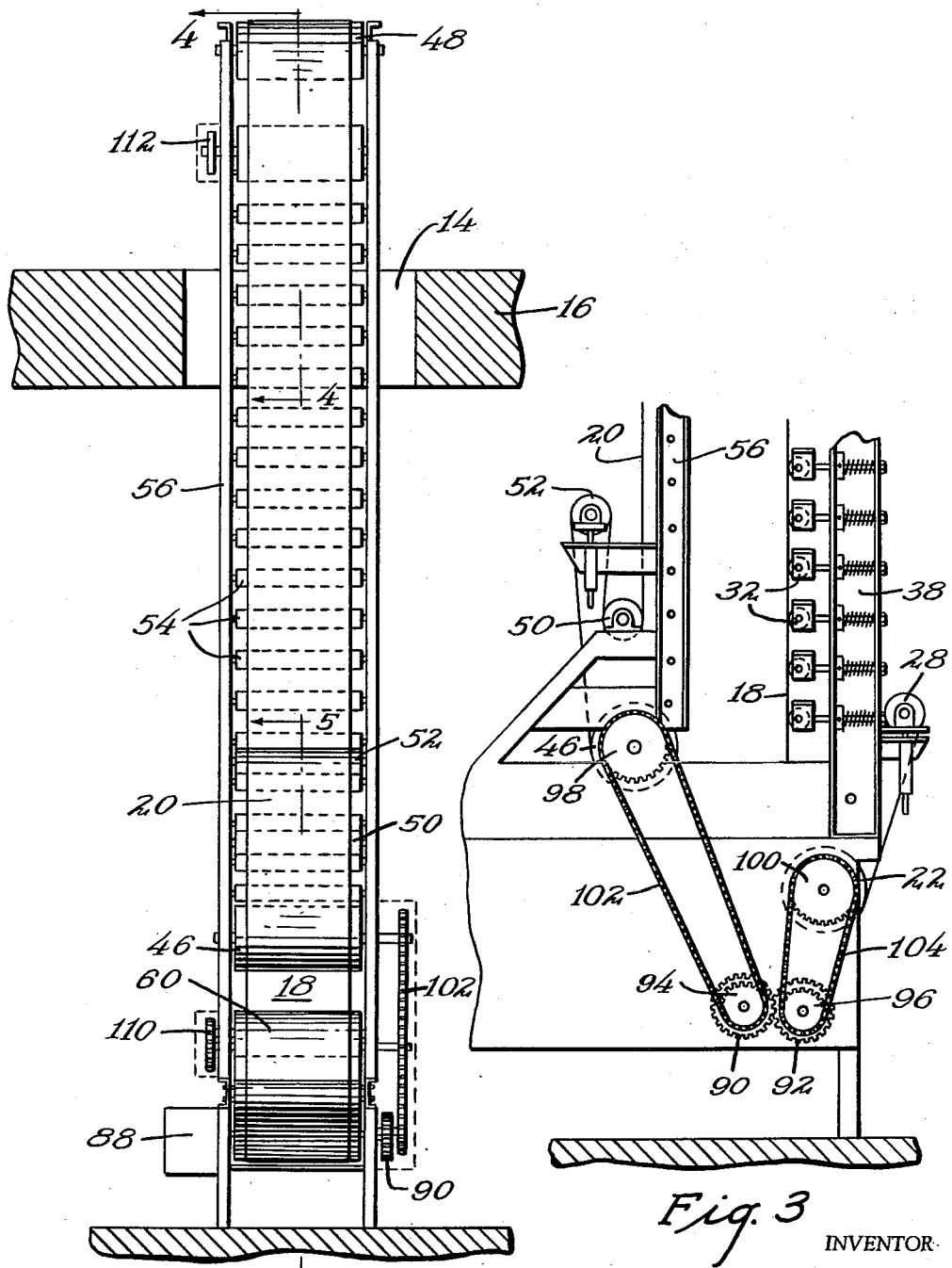
Figure 2 is a front elevational view corresponding to Figure 1.
Figure 3 is an enlarged fragmentary view of the lower end of Figure 2 when looking toward the right thereof, the view showing the drive unit in more detail.

Inasmuch as it is contemplated that cartons of somewhat differing sizes will be transferred via the conveying apparatus, a series of resiliently mounted idler rollers 30 is disposed one above the other for the purpose of engaging or pressing against the back side of the belt 18. As seen in Figures 1, 3 and 6 these rollers are journaled on brackets 32 having outturned flanges 34 affixed to the ends of rods 36. The rods 36 are slidably supported by a pair of spaced channel members 38, actually parts of the framework 10 and in order to bias or urge the rods so that the various rollers 30 will bear against the reverse side of the belt 18, each rod has circumscribed thereabout a coiled compression spring 40, one end of the springs abutting against one of the flanges on the channels 38 and the other end engaging a collar 42 suggestively held in place on the rod by a set screw 44. When so constructed it will be apparent that the rods 36 may be inserted through the channel apertures, the springs 40 and the collars 42, and the subsequent tightening of the screws 44 will render the springs 40 captive; of course other arrangements, such as the spot welding of washers might be utilized or pins extending transaxially through the rods might serve as the retaining medium. In any event when the rollers 30 are forced to the left when viewed in Figure 1 the belt 18 is permitted to flex owing to the compression of the springs 40, the compressive force being transmitted from the rods 36 to the springs via the collars 42 or whatever media is selected to attain this end.

Passing now to a more detailed description of the belt 20, it is to be observed that this belt is arranged for substantially vertical movement in much the same fashion as the belt 18, there being upper and lower pulleys or drums 46, 48 plus a pair of take-up pulleys 50, 52, one of which of the latter pulleys is vertically positionable to take up the belt slack. There are two notable differences, however, between the mounting arrangement employed in connection with the belts 18 and 20. The belt 20, it will be discerned from a close study of Figure 1, is slightly offset or angled away from a true vertical at the top in the direction of the belt 18, this being accomplished by merely disposing the axis of the pulley 48 closer to the pulley 24 than the lower pulley 46 is to the pulley 22. The other difference resides in the employment of a series of idler rollers 54 having fixed axes instead of yieldable ones as is the situation with respect to the rollers 30. To this end the rollers 54 are journaled directly to a pair of channel members 56 forming parts of the framework 10 as do the channel members 38.

While the primary purpose of the invention is to convey cartons and the like in a vertical or steeply sloping direction, it is necessary to feed or deliver such articles to the opposed belts 18 and 20 in a manner that will assure their being properly lifted. As an accessory to the belts 18, 20 and their associated mechanism, there is employed another belt 60 entrained over a pair of pulleys 62, 64 to provide a horizontal section 66 and about additional pulleys 68, 70 and 72 to provide an inclined section 74. Also cooperating with the belt 60 is a plurality of idler rollers 76 beneath the section 66. As an aid for making certain the articles remain in firm contact with the belt sections 66 and 74 during the period they are being reoriented from a horizontal to vertical position, a resilient member 78 in the form of a hold down belt brushes against the upper sides of the various cartons as they pass thereunder, the member 78 being stiff enough to perform its intended function.

At the upper ends of the belts 18 and 20 is a still further belt 80, this belt assuming a horizontal position for the purpose of receiving the cartons as they are discharged from between the belts 18 and 20. To produce the horizontal disposition of the belt 80 it is entrained over a pair of pulleys 82 and 84 having their axes of rotation in a horizontal plane with a plurality of horizontally arranged idler rollers 86 between the pulleys 82, 84.

It has already been stated that the upper end of the belt 20 is offset somewhat in the direction of the belt 18. The reason for this is to tilt the cartons slightly as they exit from between the belts 18 and 20, thereby allowing them to topple onto the belt 80. From actual experience it has been found that for the accommodation of various types of cartons and other articles a tripper unit 86 should also be employed, the tripper unit consisting of merely a transverse bar situated slightly above the pulley 24 and in the plane of the vertical run of belt 18. In this way a definite fulcrum point is provided about which the carton may pivot, and there is never any likelihood of improper discharge or continued upsetting of the carton.

Up to this time nothing has been said concerning the power means for driving the various belts 18, 20, 60 and 80. Because of the compactness of the apparatus it lends itself nicely to being driven from a single motor unit contained within a housing 88 near the floor 12. As seen in Figures 1 and 3, a pair of enmeshed gears 90 and 92 is rotatably supported by the housing 88, one of which gears is a drive gear connected to the power means, such as an electric motor, within the housing. On the same shaft with each gear 90, 92 is a sprocket 94, 96 and additional sprockets 98, 100 are directly connected to the pulleys 22, 46. Passing over the sprockets 94 and 98 is a chain 102, and over the sprockets 96 and 100 passes a second chain 104. By using duplicate sizes of gears and sprockets it will be manifest that the belts 18 and 20 will be driven at identical linear speeds and the use of two gears 90 and 92 assures that the opposed sections of the belts will be moved upwardly in the same direction.

Continuing with the idea in mind of using a single power unit a take-off sprocket 106 (Figure 1) is attached to the end of the pulley 22 opposite the sprocket 98 and this sprocket serves as the means by which still another sprocket 108 on the pulley 70 is driven via a chain 110, thereby accounting for the powered movement of the belt 60 at the proper speed and direction for introducing the articles to the belts 18 and 20. For driving the belt 80, a take-off sprocket 112 is mounted for rotation with the pulley 24, it serving to drive a sprocket 114 on the pulley 82 via a chain 116. Quite obviously, grooved sheaves and V-belts might be substituted for the aforenoted sprockets and chains.

From the foregoing the operation of the described conveying apparatus is believed obvious. A plurality of articles collectively bearing the reference numeral 118 arrive beneath the entrance to the belts 18 and 20 by way of the belt 60, the resilient plate 78 serving to maintain contact of the cartons against the belt 60 and thus assure their proper delivery to the space between the vertically arranged belts 18 and 20. The cartons in this way are effectively upended for their vertical travel between the belts 18, 20.

Assuming the height of the cartons or cases 118 varies between the limits 8¾" and 10¼", that is the height when passing along the belt 60, then the rollers 30 should be capable of moving approximately 1½" transversely with respect to the path of the inner section of the belt 18. The spacing between the upwardly moving sections of the belts 18, 20 should then be approximately a minimum of 8½" and a maximum of 10", the rollers 30 by reason of their associated springs 40 yielding sufficiently from the 8½" belt spacing to the maximum spacing of 10". In this manner all cases between these limits will be pressurally accommodated between the opposed belts 18 and 20. Of course the weight of the cartons 118 and their ability to withstand crushing will in a large measure govern the spring pressure supplied by the springs 40; as an example, assuming the cases 118 to be filled with twenty-four 12 ounce bottles or cans, actual design has shown that the spring pressure should be a maximum of 8 pounds at 2½" compression.

Once the cartons 118 reach the top of the belts 18 and 20, the offset of the latter belt is instrumental in tipping the cartons about the tripper unit 86 so that they fall onto the discharge belt 80. It might be mentioned at this point that the degree of offsetting of the upper end of the belt need not be great, 1½" sufficing when the pulley 48 is mounted about 12" above the pulley 24. From the belt 80 the cartons are automatically passed onto a loading platform from where they can be readily removed for storage or shipping.

As many changes could be made in the above construction and many apparently widely different embodiments of the invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim:

1. A conveying apparatus for rectangular objects including vertically spaced pulleys and a conveyor belt supported thereby, a series of vertically spaced rollers engaging the inner surface of said belt and resilient roller supporting means for said rollers urging these rollers against the belt to force the belt outwardly, a tripping unit comprising fixed means above the uppermost pulley inwardly of the plane of the portion of the belt engaged by said rollers, a second conveyor belt supported by second vertically spaced pulleys, said second pulleys being supported on axes parallel the axes of the first pulleys, said second pulley supporting one side of the second conveyor belt in generally parallel spaced relation to the portion of the first conveyor belt against which said rollers engage, said second belt extending above the upper pulley of the first belt, rollers within said second belt against which said second belt may be urged by an object carried between said belts, said last named rollers terminating below the level of said upper pulley of said first belt, and means for moving the opposed portions of said two belts upwardly, whereby movement of an object upwardly will cause one side of the object to move along said tripping means and the opposite side of the belt may flex inwardly between the upper of said second pulleys and the uppermost roller within said second belt, said tripping means acting as a fulcrum over which the object may tilt.

2. The structure of claim 1 and in which the portion of the second belt against which the object engages normally inclines slightly toward the first belt and away from the rollers within said second belt.

References Cited in the file of this patent

UNITED STATES PATENTS

| | | |
|---|---|---|
| 1,514,185 | Van Houten | Nov. 4, 1924 |
| 1,991,652 | Bean | Feb. 19, 1935 |
| 2,257,351 | Silver | Sept. 30, 1941 |
| 2,674,366 | Kindseth et al. | Apr. 6, 1954 |

FOREIGN PATENTS

| | | |
|---|---|---|
| 647,597 | France | July 31, 1928 |
| 511,629 | Germany | Oct. 31, 1930 |